United States Patent [19]
Rice

[11] Patent Number: 5,867,608
[45] Date of Patent: Feb. 2, 1999

[54] METHOD AND APPARATUS FOR SCALING IMAGES

[75] Inventor: Daniel S. Rice, Oakland, Calif.

[73] Assignee: Sun Microsystems, Inc., Mountain View, Calif.

[21] Appl. No.: 554,858

[22] Filed: Nov. 7, 1995

[51] Int. Cl.$^6$ .............................. G06K 9/32; G06K 9/36
[52] U.S. Cl. .................. 382/277; 382/297; 382/298; 382/299; 348/581
[58] Field of Search .................... 382/260, 298, 382/299, 300, 245, 277, 297; 395/139, 140, 516; 358/401, 430; 348/581

[56] References Cited

U.S. PATENT DOCUMENTS

| | | | |
|---|---|---|---|
| 4,277,835 | 7/1981 | Garziera et al. | 395/140 |
| 4,472,732 | 9/1984 | Bennett et al. | 348/452 |
| 4,783,834 | 11/1988 | Anderson et al. | 382/245 |
| 4,837,845 | 6/1989 | Pruett et al. | 382/46 |
| 4,908,874 | 3/1990 | Gabriel | 382/277 |
| 5,020,115 | 5/1991 | Black | 382/298 |
| 5,095,374 | 3/1992 | Klein et al. | 358/430 |
| 5,412,483 | 5/1995 | Ludlow et al. | 358/401 |
| 5,487,146 | 1/1996 | Guttap et al. | 395/516 |
| 5,587,742 | 12/1996 | Hau et al. | 348/441 |

FOREIGN PATENT DOCUMENTS 0 200 283  4/1981  European Pat. Off. ........ G06F 15/62

OTHER PUBLICATIONS

J. Ward and D. Cok, *Resampling Algorithms for Image Resizing and Rotation*, Proc. SPIE Digital Image Processing Applications, vol. 1075, 1989, pp. 260–269.

*Primary Examiner*—Bipin Shalwala
*Assistant Examiner*—Daniel G. Mariam
*Attorney, Agent, or Firm*—Blakely Sokoloff Taylor & Zafman

[57] ABSTRACT

A method and system for resizing images in a computer system. A plurality of buffers are dynamically created in the memory of the computer system. Among the created buffers are a horizontal sampling buffer and two vertical sampling buffers. The horizontal sampling buffer is filled with data from a plurality of rows of the source image. The horizontal sampling buffer is composed of sub-buffers, each constituting a subset of the horizontal sampling buffer. Each sub-buffer is bytewise transposed to provide easy access to different channels of the image data. A filter is then applied to the transposed data with a result being stored in another buffer. The filtered data is then retransposed to assume its original configuration. The retransposed data is stored in a vertical sampling buffer previously created. The foregoing steps are repeated to fill a second vertical sampling buffer. Thereafter throughout the processing, two vertical sampling buffers remain continuously filled to allow vertical filtering without concern for invalid data. When data is no longer needed in one of the vertical sampling buffers for the ongoing filtering, it can be refilled with new data corresponding to the next group of vertical neighbors. By buffering the data, various symmetries can be exploited and known problems such as edge conditions and alignment issues can be handled early in the resizing scheme providing for more efficient processor operation.

16 Claims, 6 Drawing Sheets

METHOD AND APPARATUS FOR SCALING IMAGES

BACKGROUND OF THE INVENTION

1. Field of the Invention

The invention relates to graphical resizing of images. More specifically, the invention relates to a method and system for backward mapping graphical data several bytes at a time.

2. Related Art

Resizing graphical data is generally well-known in the art. Two commonly used approaches are forward mapping and backward mapping. In a forward map, the algorithm asks: for each source pixel, where does it land in the destination image? Conversely, for a backward map, the question is for each destination pixel, where does it come from in the source image? A forward map requires arbitration between pixels landing in the same destination, while a backward map requires a certain amount of work for each pixel to determine which source image pixel or pixels it came from, and then it is never necessary to revisit that pixel again.

In a backward mapping scheme, once it has been established for each destination pixel, where it comes from in the source or sources, it is necessary to determine for each source pixel contributing to the destination pixel, a co-efficient of contribution of that source pixel. Typically, for cases where there is more than one source pixel contributing, either two or four pixels are deemed to provide the contribution. This corresponds to bi-linear, and bi-cubic filtering, respectively. The calculation of these coefficients is generally well-known in the art and while computationally intensive, it need be done only once for each row and once for each column. The calculated coefficients are then stored in an array to be accessed during subsequent processing. The above-described scheme will allow one to do either pure horizontal or pure vertical resizing. However, in the event that it were desirable to do both vertical and horizontal resizing at the same time, it would, of course, be necessary to choose some square of source pixels and weight them all with appropriate coefficients. This would require a pixel-by-pixel coefficient calculation and manipulation. By choosing the filter coefficients correctly, it is possible to do stretching in a separable way, i.e. first horizontal stretching and then vertical, or vice versa. Such techniques are well-known in the art.

Coefficients are selected by choosing a geometrical point that is the center of the destination pixel and establishing the function that maps points in the source to the destination, thereby generating a scaled translation where the destination is a linear function in x and y. The inverse of the function yields the point in the source from which the data comes. If the selected point is not the center of the source pixel, it is necessary to interpolate the source data to determine the relative distances between various source pixel centers and weight them accordingly. Thus, the filter coefficients are a function of subpixel position of a backward mapped destination point.

In "Resampling Algorithms for Image Resizing and Rotation" Proc. SPIE Digital Image Processing Applications, vol. 1075, pp. 260–269, 1989, Joseph Ward and David R. Lok provide an algorithm for quantizing the subpixel positions down to e.g. 1/32nd or 1/256th of a pixel and provides ready-made tables of filters which apply for a pixel in that area. Each area is known as a bin. Thus, for each bin, a different filter coefficient is established.

It is relatively straight forward to write a program in C or a C variant to read individual source pixels from a source image and resize them individually. However, there is no straightforward way to operate on multiple adjacent pixels of source data. Operating on multiple pixels of adjacent source data is further complicated by the fact that the data may well be stored in unknown formats. For example, graphical data is commonly stored in band interleaved format where, for example, three successive bytes in memory represent red, green, and blue components of a single pixel. This complicates the issue where it is desired to multiply the adjacent pixel in memory by a filter, since for an arbitrary section of image data, it is not clear whether four bytes represent four pixels or $1\frac{1}{3}$ pixels. By operating on multiple bytes simultaneously, the speed over standard resizing algorithms can be vastly increased. Therefore, it is desirable to develop a method where multiple bytes of data can be operated on simultaneously without regard for their memory format.

BRIEF SUMMARY OF THE INVENTION

A method and system for resizing images in a computer system is disclosed. A plurality of buffers is dynamically created in the memory of the computer system. Among the created buffers are a horizontal sampling buffer and two vertical sampling buffers. The horizontal sampling buffer is filled with data from a plurality of rows from the source image. Such filling can be performed several bytes at a time.

The horizontal sampling buffer is typically eight bytes wide and as long as the width of a source image row. Basically, a first source image row is placed in the horizontal sampling buffer eight bytes in row 0, then skip seven rows and put the next eight bytes in the buffer row 8, etc. until the entire source row is in the horizontal sampling buffer. The process is repeated for each successive source image row with an offset of one from its predecessor row until eight source rows are in the horizontal sampling buffer, e.g. the second source row is placed in buffer rows 1, 9, 17, etc. Thus, the vertical neighbors in the source image are vertical neighbors in the horizontal sampling buffer. The horizontal sampling buffers are composed of sub-buffers, each source constituting eight bytes of eight adjacent source image rows. Each sub-buffer is bytewise transposed to provide easy access to different channels of the image data. The transposition exposes the bands of a band interleaved format for easy processing.

Once the data is transposed, a filter is then applied to the transposed data with the result being stored in another buffer, either an intermediate buffer or vertical sampling buffer. However, if the data is placed directly into the vertical sampling buffer, then transposition in place will be required. Thus, transposition is simplified by employing an intermediate buffer. The filtered data is then retransposed to assume its original configuration. The retransposed data is stored in a vertical sampling buffer previously created. The foregoing steps are repeated to fill a second vertical sampling buffer. Subsequently, throughout the processing of the source image, two vertical sampling buffers remain continuously filled to allow vertical filtering at high speed. By ping-ponging between the buffers, valid data for the vertical filtering is assured. When data is no longer needed in one of the vertical sampling buffers for the ongoing filtering, it can be refilled with new data corresponding to the next group of vertical neighbors. The filtered data may need to be converted from sixteen bit values to eight bit values clamped at the extremes. Once the conversion is complete, the resized image can be output to the screen or stored in memory for latter processing.

The ULTRASPARC of Sun Microsystems visual instruction set supports several instructions which facilitate processing using the method described. Using the visual instruction set (VIS), eight bytes are read or written simultaneously. Similarly, VIS allows operations with four byte operands. Certain instructions such as the fpmerge instruction allow simplified transposition over prior methods. By aligning the data in buffers, alignment edge condition issues can be addressed early in the resizing scheme to allow more efficient use of processing resources by eliminating checks and branches in inner loops. Similarly, while the system must know the format of the source and destination data, all format specific issues can be handled in an external loop. Since horizontal and vertical processing can be done separately, multi-threading in a multi-processor environment is easily accomplished.

DETAILED DESCRIPTION OF THE INVENTION

The method and apparatus for resizing graphical images in a computer are disclosed. In the following description, for purposes of explanation, specific applications, numbers, materials, and configurations are set forth in order to provide full understanding of the present invention. However, it would be apparent to one skilled in the art that the present invention may be practiced without the specific details. In other instances, well known systems are shown in diagrammatical or block diagram form in order not to obscure the present invention unnecessarily.

Figure 1:
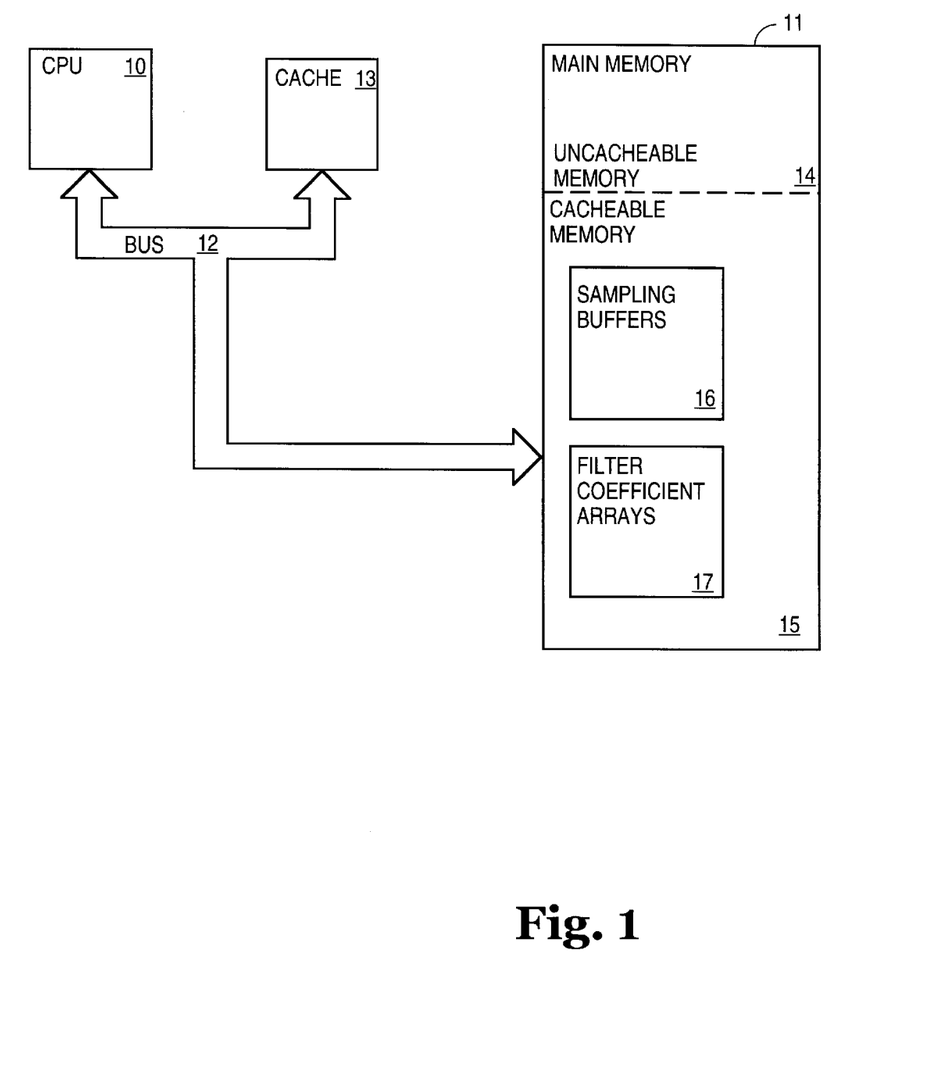
FIG. 1 is a block diagram of a computer system employing the invention.

FIG. 1 shows a block diagram of a computer system for use in connection with the invention. Central Processing Unit (CPU) 10 is coupled by bus 12 to main memory 11 and cache memory 13. Main memory 11 is composed of cacheable memory 15 and uncacheable memory 14. Sampling buffers 16 of the instant invention reside in cacheable memory 15. Filter co-efficient arrays 17 also reside in cacheable memory 15. It is desirable that sampling buffers 16 be dynamically allocatable to increase flexibility of the system.

Figure 2A:
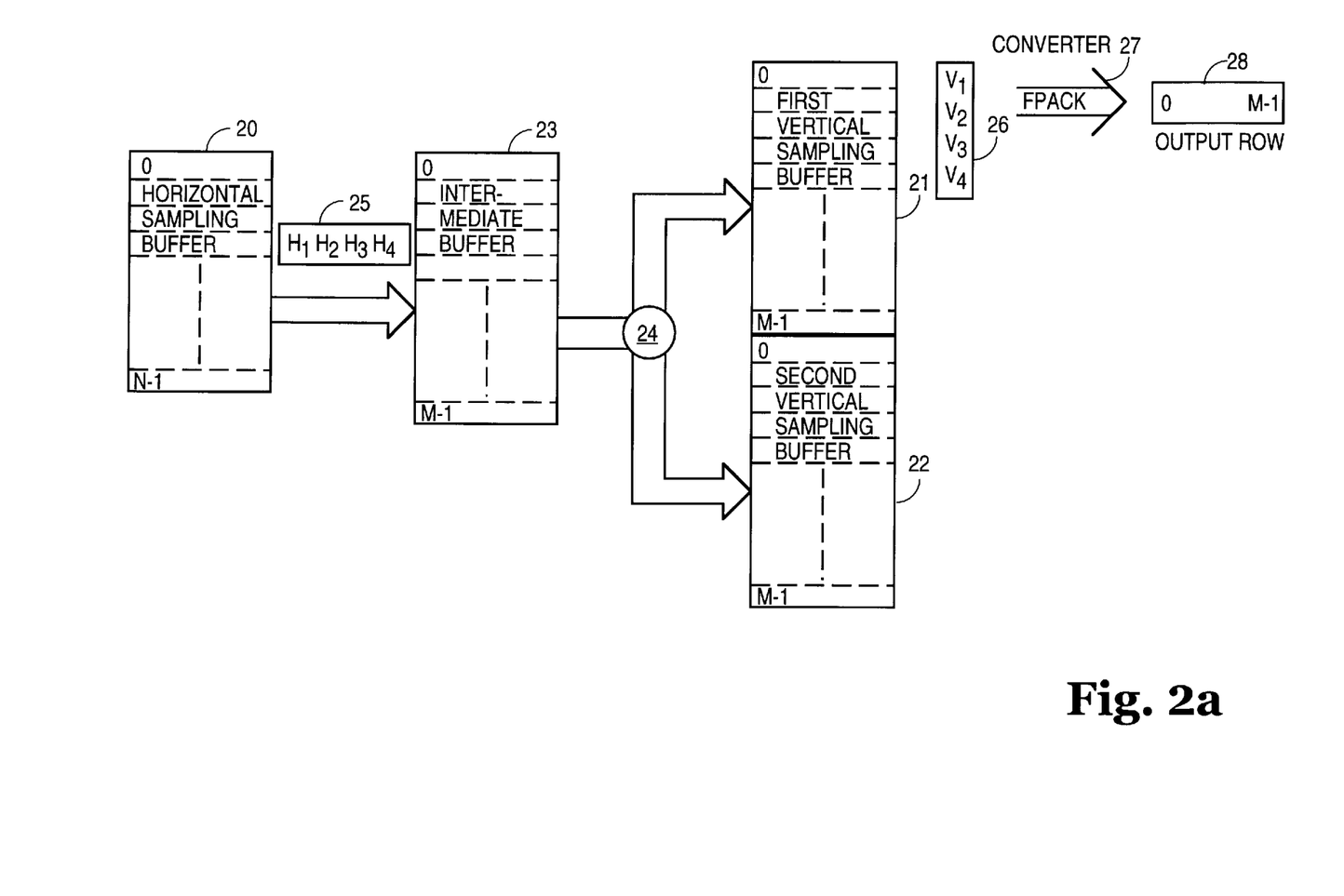
FIG. 2a is a block diagram of the buffering scheme in one embodiment of the invention.

FIG. 2a shows the buffering scheme of the exemplary embodiment of the invention. A horizontal sampling buffer 20, 8 bytes wide and N rows long, is used to accept eight rows of image data from the source image. Thus, N is equal to the byte length of a source image row, which may be greater than or equal to the pixel length of the source image row. Alignment issues and edge conditions are dealt with as the data is moved from memory into the horizontal sampling buffer. Accommodation of edge conditions and alignment issues is explained more fully below. The data in the horizontal sampling buffer is transposed and placed to expose bands for processing. The transposition will also be explained more fully below. A horizontal filter 25 is applied to the transposed data in the horizontal sampling buffer with the result of the filtering being placed in an intermediate buffer 23, 8 bytes wide and M rows long. M is equal to the length of a row in the destination image. The data in the intermediate buffer is retransposed into either a first vertical sampling buffer 21 or a second vertical sampling buffer 22. Controller 24 dictates which buffer receives the current data from intermediate buffer 23. A vertical filter 26 is applied to the data in the vertical sampling buffers 21,22. In one exemplary embodiment, application of the vertical filter involves taking eight bytes from each relevant row in the vertical sampling buffer. Relevant rows are dictated by the filter width, e.g. a filter width of four results in four relevant rows. Parallel multiplications and additions are performed on this data to yield vertically sampled data, which may need to be converted as explained below. Ultrasparc® Visual Instruction Set (VIS) provides fmul8x16 and fpadd16, which are ideal for use in the parallel multiplication and addition of this vertical filtering scheme.

The backwards mapping scheme is such that as processing proceeds downward in the source image, it also proceeds strictly downward in the source image. Therefore, once the vertical filter 26 needs data beyond the second vertical sampling buffer 22, the data in the first sampling buffer 21 will never be revisited. Therefore, the first sampling buffer can be immediately refilled with new data. This assumes that the filter width is less than or equal to the number of destination rows in the buffer, in this example, eight. As the vertical filter 26 transitions through the second vertical sampling buffer 22, it re-enters the first vertical sampling buffer to process the new data. Once the vertical filter 26 has made the transition from the second sampling buffer back to the first vertical sampling buffer 21, the second vertical sampling buffer 22 can be refilled. Thus, controller 24 toggles the data directed from first to second sampling buffer 22 responsive to the transition of the vertical filter 26 from one buffer to the next. The controller 24 then ping-pongs between the vertical sampling buffers as needed data is no longer available. It will be understood by one of ordinary skill in the art that additional buffers could be used without departing from the scope or contemplation of the invention.

Since an application of the filter may not yield an eight bit value, converter 27 converts sixteen bit outputs of the vertical filter 26 to an eight bit entry for the M byte output row 28. Moreover, converter 27 clamps the extremes at 0 and 255. When the invention is used with the VIS, the fpack instruction fulfills this converting function.

Significantly, because the horizontal sampling and vertical sampling are independent of each other, additional horizontal sampling can be performed simultaneously with the vertical sampling of previously horizontally sampled data. It is also within the scope and contemplation of this invention to provide additional intermediate buffers 23 so as not to create a bottleneck at the intermediate buffer 23. This arrangement is ideal for multi-threading as the workload can readily be distributed amongst multiple processors. Thus, as soon as the horizontal sampling buffer has been wholly sampled into the intermediate buffer, it can be refilled, and processing can begin again.

Figure 2B:
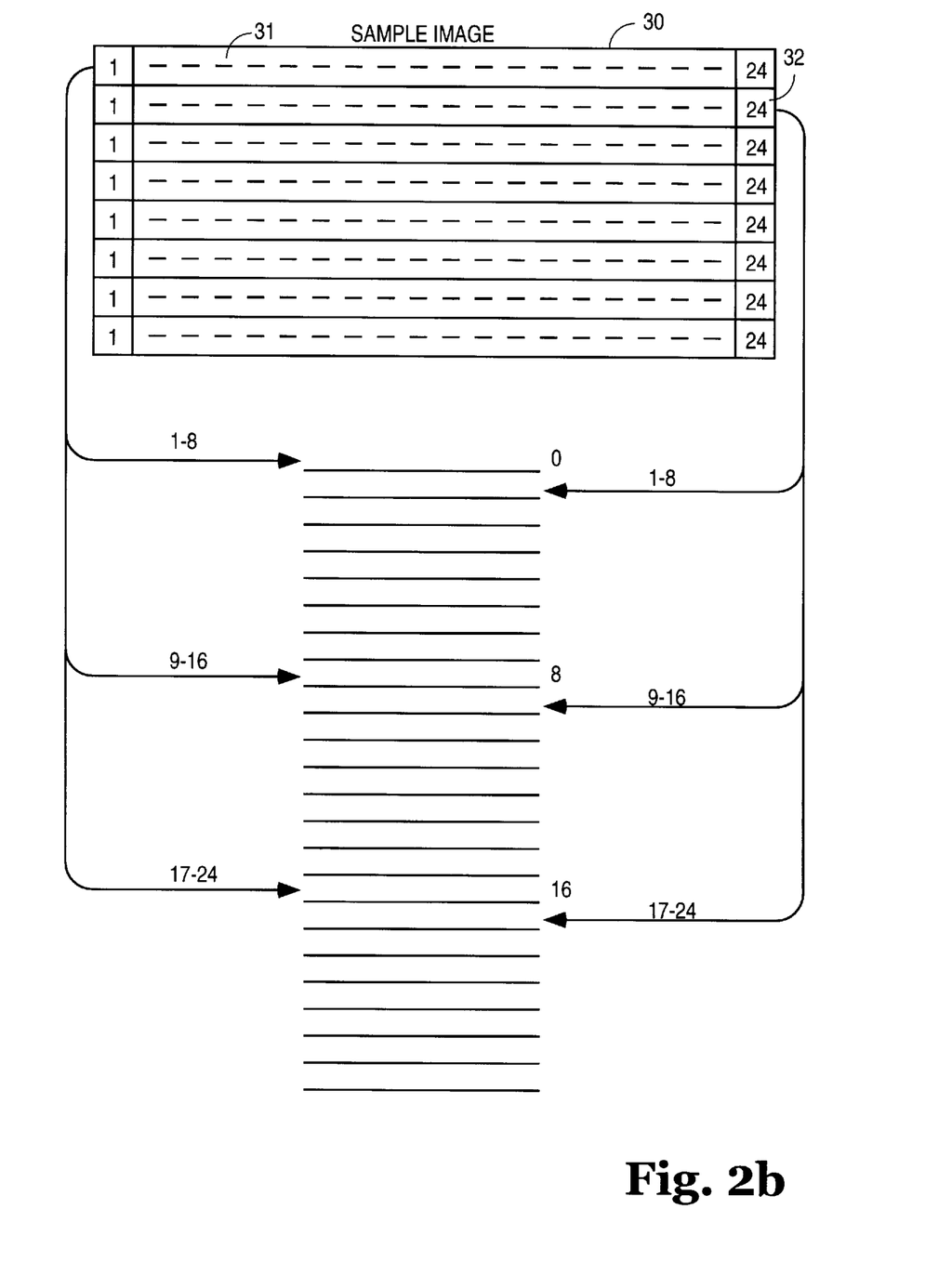
FIG. 2b is a diagram showing the way buffers are filled in an embodiment of the invention.

FIG. 2b shows an example source image 30 having eight rows, each of twenty-four bytes. Horizontal sampling buffer 20 is filled with, for example, the first eight bytes of row 31 going into row 0 of the horizontal sampling buffer 20, bytes 9–16 of row 31 going to row 8 of the horizontal sampling buffer 20, and bytes 17–24 going to row 16 of the horizontal sampling buffer 20. Similarly, row 32, bytes 1–8 going to row 1 of the horizontal sampling buffer 20, bytes 9–16 going to row 9, and bytes 17–24 going to row 17. The remaining rows follow the same pattern. If the source image 30 were composed of additional rows, they would be processed on a subsequent filling of the horizontal sampling buffer 20. If the sample image 30 had rows of greater length, the length of the horizontal sampling buffer would be increased proportionally. Significantly, the length of the horizontal sampling buffer is equal to the next multiple of 8 greater than or equal to the length of a source image line. For example, a source image having lines between 25 and 32 bytes would each result in a horizontal sampling buffer of 32 line length. Each iteration of processing of the horizontal sampling buffer processes 8 complete lines of the source image.

Edge conditions are a well known concern in sizing algorithms. Basically stated, the problem is if you need a pixel to the left of the left most pixel, what do you do? By padding of the horizontal sampling buffers, edge conditions can be easily satisfied. For example, if we need two edge pixels, begin by placing the data at the third position of each row in the horizontal sampling buffer. Then entries in the first and second byte can be synthesized either with copies of the first data entered in the third byte or, for example, zero. Alignment is another issue that can be addressed early in the buffering scheme. Basically, there is no guarantee a source image row will begin aligned with a memory word. Thus, where the system retrieves multiple bytes, e.g. 8, simultaneously, there is no assurance that the source row will begin at an even multiple of eight. Thus, the first retrieval may include data not within the source image which the user does not want to buffer. VIS provides the instructions faligndata and alignaddr which used in conjunction allow the data to be taken from memory and easily aligned in the horizontal sampling buffer through use of an internal register, the graphics status register ("gsr"). For example, if a group of eight bytes r has five bytes of junk followed by three bytes of valid image data and another group s contains eight valid bytes, alignaddr (0,5) sets the gsr align bits to five. Subsequent use of the faligndata instruction on r and s will yield eight bytes of valid data Thus, where t contains the next valid group of eight bytes of image data, faligndata (r, s) and faligndata (s, t) will yield $r_{5-7} s_{0-4}$ and $s_{5-7} t_{1-4}$, respectively. An analogous issue exists in writing the results of a vertical pass into a possibly unaligned destination. The faligndata instruction can be used to resolve destination alignment issues as with the source data.

Figure 3A:
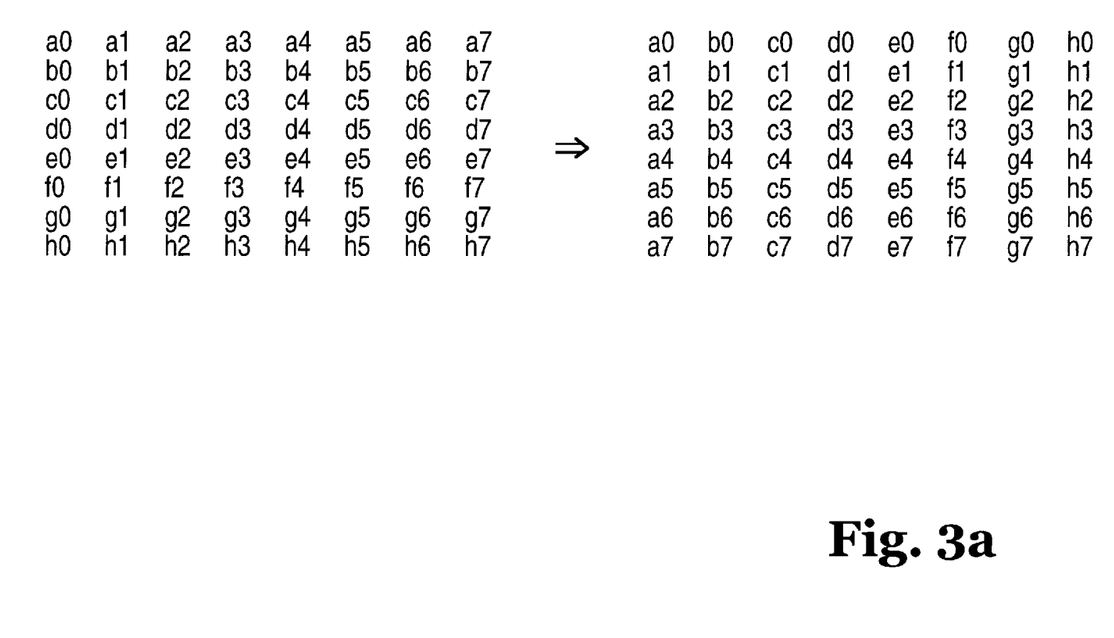
FIG. 3a is a sample sub-buffer of the invention and its transpose in accordance with the invention.
Figure 3B:
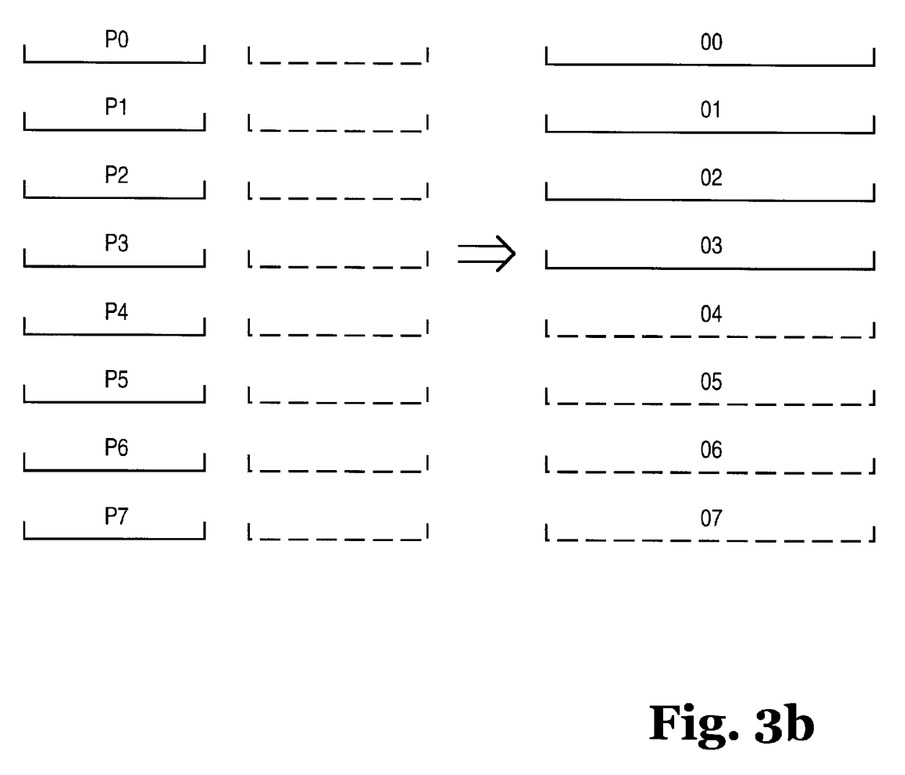
FIG. 3b is a diagram of sub-buffer transposition in parts in accordance with one embodiment of the invention.
Figure 3C:
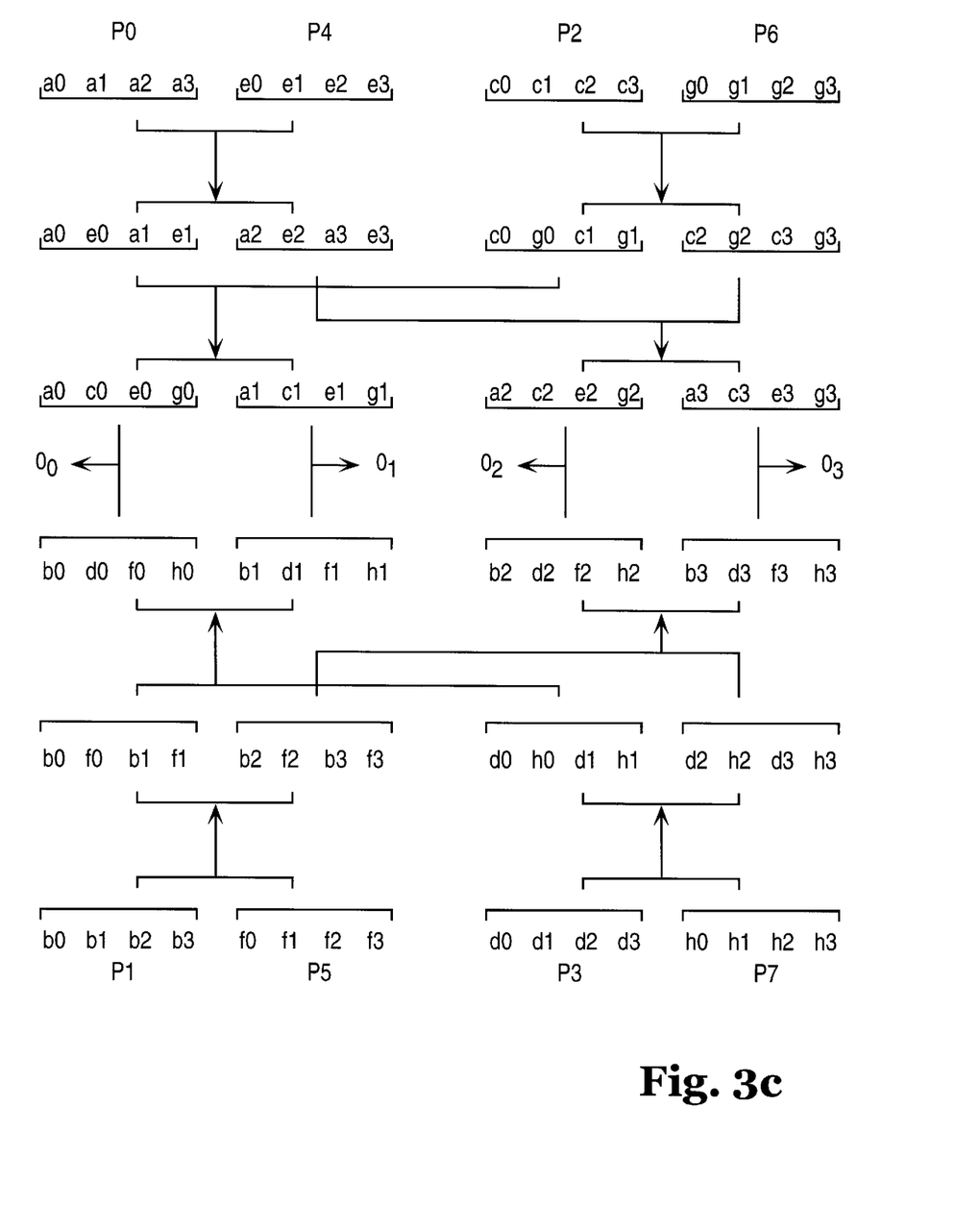
FIG. 3c is a transposition tree for half a sub-buffer in one embodiment of the invention.

Transposition is performed within the horizontal sampling buffer 20 in eight row blocks, e.g. rows 0–7 are transposed, rows 8–15 are transposed, rows 16–23 are transposed in the example of FIG. 2b. FIG. 3a shows such a transposition. Such bytewise transposition exposes data band by band every time. For example, if in FIG. 3a, Red Green Blue (RGB) band interleaved format were present, 0, 3, and 6 would correspond to the red band 1, 4, and 7 to the green band, and 2 and 5 would correspond to the blue band. Generally, transposition is inefficient because every row of the output depends on every row of the input. Serendipitously, VIS includes a functionality where two 4-byte words can be merged to form a group of 8 (double word) bytes. The fpmerge instruction applied to $a_0 a_1 a_2 a_3$ and $e_0 e_1 e_2 e_3$ yields $a_0 e_0 a_1 e_1 a_2 e_2 a_3 e_3$. FIG. 3c shows a transposition tree using the merge functionality to effect the transposition. As shown in FIG. 3c, within an 8×8 segment, each word is merged with a word four rows distant. This is the effect of transposing an 8×8 block as two 4×8 blocks as shown in FIG. 3b. The horizontal sampling buffer can be transposed in place using this method or the data can be initially placed in a pre-buffer and transposed into the horizontal sampling buffer 20. It is anticipated that future computer systems will support the functionality of the fpmerge instruction of the VIS. Accordingly, this method of transposition and image sizing is not intended to be limited to the ULTRASPARC® system.

Significantly, it is essential that the data be appropriately aligned prior to conducting the transposition. Thus, transposing the data in memory incurs a performance penalty because (1) care must be taken to avoid overwriting the source image data, and (2) because in memory, there is no assurance of proper alignment, e.g. the first word of a source row may begin at an arbitrary point in a memory word and there is no assurance that successive source rows will be aligned the same relative to a memory word. The above-described buffering scheme appropriately aligns the data so that each 8×8 block is aligned for transposition.

Once the data has been transposed and horizontally sampled into the intermediate buffer 23, it is then retransposed using the same transposition scheme into one of the vertical sampling buffers 21,22. It will be recognized by one of ordinary skill in the art that it is possible to transpose the data in place within the intermediate buffer 23. Accordingly, it would be possible to eliminate the intermediate buffer 23 entirely and transpose the data in place in one of the vertical sampling buffers 21,22.

If it is the desire to expand fewer than all the bands in the source image, it is possible to do so by stepping through the transposed data appropriately. For example, if the data is in red, green, blue format, and one only wishes to expand the blue band, the filtering would begin with row 2 and step by 3 to fill the intermediate buffer. This results in an intermediate buffer having valid blue data and junk in the red and green data locations. A bit mask may be maintained for channel selection to prevent the junk from being written to the vertical sampling buffer. The mask should be at least eight bits long and an even multiple of the number of output channels. After each application, the mask is rotated by eight and applied to the next eight rows in the intermediate buffer.

Sometimes it is desirable to put the output into a different format than the source format. For example, the frame buffer employed to output the image to the monitor may be of the format xbgr, while the source is in an rgb format. In such case, as the bands are processed horizontally, they are placed in the intermediate buffer such that the retransposition into the vertical sampling buffer will result in the desired ordering. For example, red data will be moved from the first entry in the horizontal sampling buffer to the entry of the intermediate buffer which will be in the fourth slot of the vertical sampling buffer. A mask is used to mask out, e.g. the X rows of the vertical sampling buffer, which do not represent valid data from the source image. The VIS supports partial stores and edge instruction which are used in an exemplary embodiment to effect desired output formatting.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of image processing comprising:

a) creating a horizontal sampling buffer and a first and a second vertical sampling buffer;

b) filling the horizontal sampling buffer with data from a plurality of rows of a source image;

c) transposing the data to expose the data band by band;

d) applying a filter to the transposed data, resulting in a transposed horizontally filtered data;

e) retransposing the transposed horizontally filtered data to yield horizontally filtered data;

f) storing the horizontally filtered data in the first vertical sampling buffer;

g) repeating steps b)–e) with regard to a next plurality of rows of a source image to yield a next horizontally filtered data;

h) storing the next horizontally filtered data in the second vertical sampling buffer; and i) vertically filtering the horizontally filtered data and the next horizontally filtered data.

2. The method of claim 1 wherein the step of filling comprises the steps of:

padding the horizontal sampling buffer to accommodate edge conditions; and aligning in the horizontal sampling buffer any data that is unaligned in main memory.

3. The method of claim 1 wherein the horizontal sampling buffer is eight bytes wide.

4. The method of claim 3 wherein the horizontal sampling buffer is filled eight bytes at a time, and each successive eight bytes of a source image row are offset by eight rows in the horizontal sampling buffer.

5. The method of claim 4 wherein each eight rows is a sub-buffer, and the number of sub-buffers is equal to the number of bytes in a source image row divided by eight.

6. The method of claim 5 wherein each sub-buffer is transposed independently of each other sub-buffer.

7. The method of claim 1 wherein the step of retransposing the data comprises the steps of:

creating an intermediate buffer;

storing the transposed horizontally filtered data in the intermediate buffer; and transposing the intermediate buffer into a vertical sampling buffer.

8. The method of claim 1 wherein the step of filling is performed eight bytes at a time.

9. The method of claim 1 wherein a filter width of less than or equal to eight is used for all filtering.

10. A computer system comprising:

a processor;

a main memory;

a bus coupling the processor to the main memory;

a dynamically sized horizontal sampling buffer residing in the memory for buffering image data during horizontal processing including transposing the image data to expose the data band by band; and a pair of dynamically sized vertical sampling buffers residing in the memory for buffering retransposed horizontally processed data during vertical processing.

11. The computer system of claim 10 further comprising a cache memory coupled to the processor and the memory by the bus wherein the horizontal sampling buffer and the vertical sampling buffers resides in a cacheable portion of the main memory.

12. The computer system of claim 11 wherein the horizontal sampling buffer is eight bytes wide and its length is equal to the length of a source image row, and the vertical sampling buffers are each eight bytes wide and equal in length to a destination image row.

13. The computer system of claim 12 further comprising an intermediate buffer residing in memory having a dimension equal to that of a vertical sampling buffer.

14. The computer system of claim 10 wherein the processor supports a merge and a pack function.

15. The computer system of claim 10 wherein the processor performs reads and writes eight bytes at a time.

16. The computer system of claim 15 wherein the processor performs operations with four byte operands.

* * * * *